Figure 2:
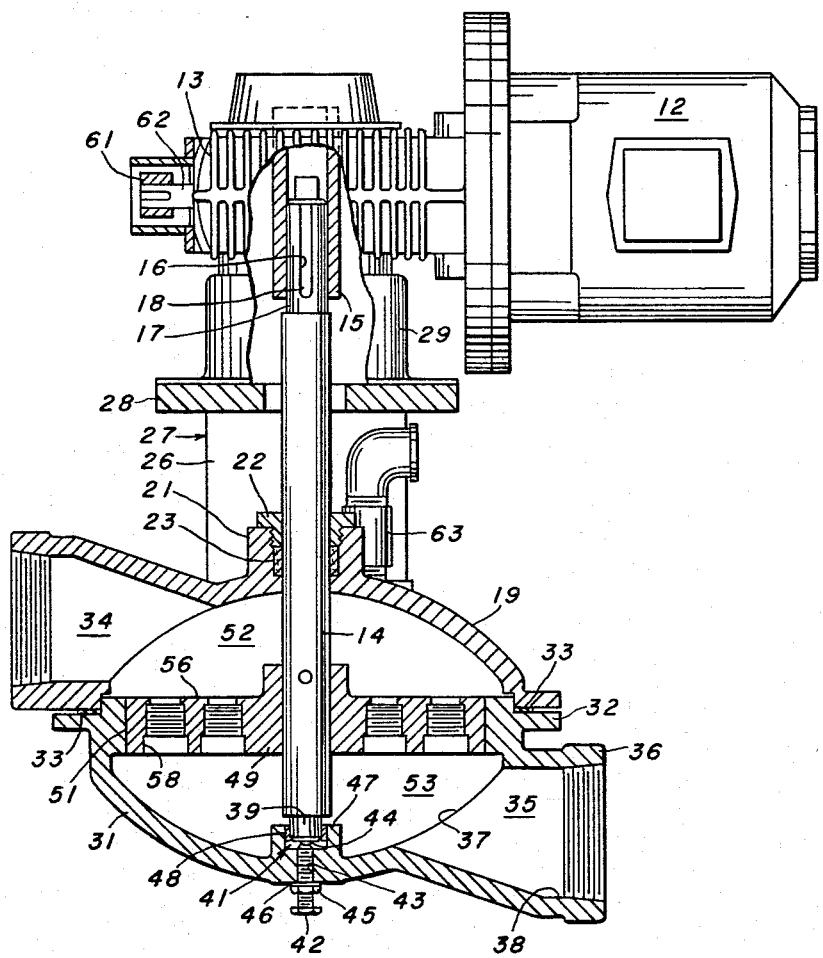

Sept. 27, 1966    H. B. CARR    3,275,151
DISC-TYPE STRAINER
Original Filed Nov. 24, 1961    2 Sheets-Sheet 1
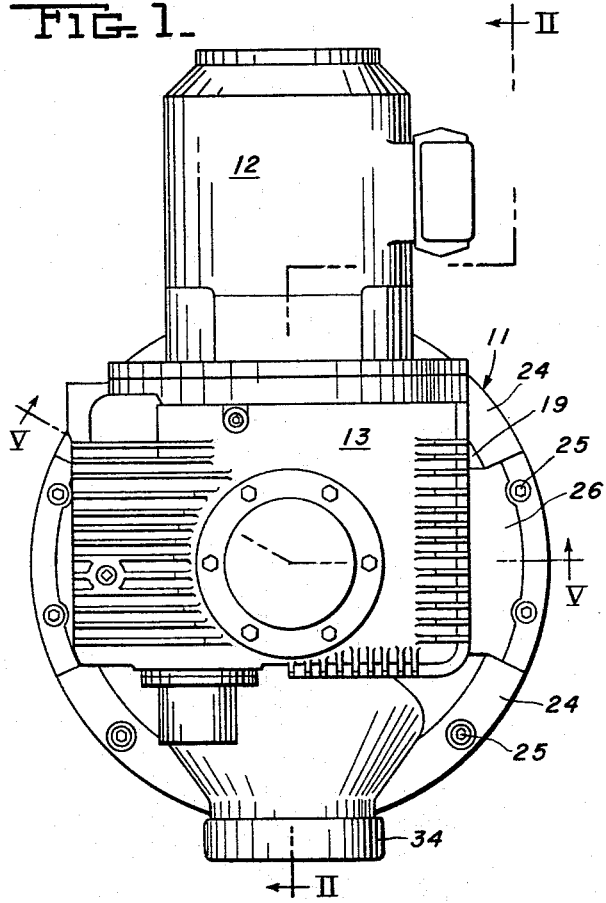
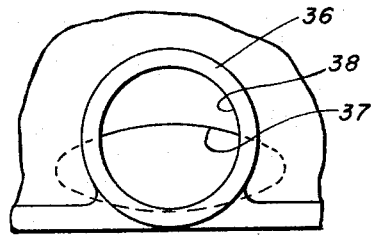
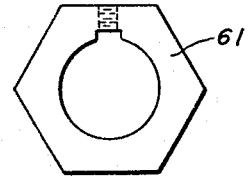
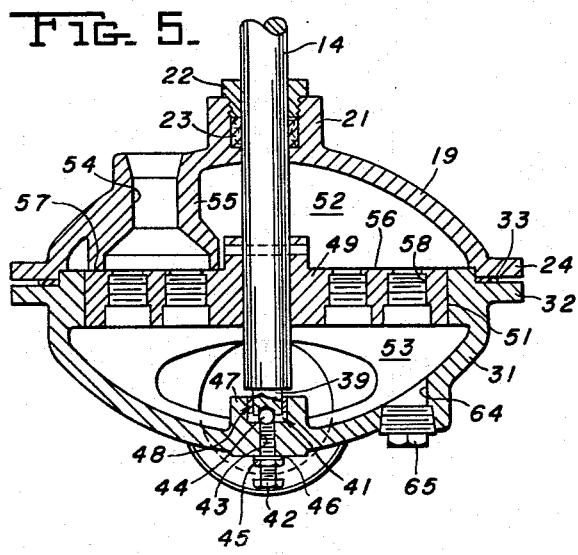
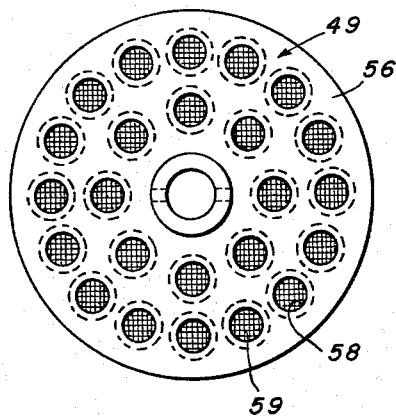
INVENTOR.
HUGH B. CARR
BY Christy, Carmela, & Strickland
Attorneys

INVENTOR.
HUGH B. CARR

Attorneys

United States Patent Office 3,275,151
Patented Sept. 27, 1966

3,275,151
DISC-TYPE STRAINER
Hugh B. Carr, Carnegie, Pa., assignor to S. P. Kinney Engineering, Inc., Carnegie, Pa., a corporation of Pennsylvania
Continuation of application Ser. No. 154,570, Nov. 24, 1961. This application July 19, 1965, Ser. No. 482,014
1 Claim. (Cl. 210—333)

This invention relates to a disc-type strainer and, more particularly, to a disc-type strainer having a backwash for flushing the strained particles from a strainer disc, and is a continuation of application Serial No. 154,570, filed November 24, 1961, now abandoned.

Many types of strainers are used industrially for removal of solids from water used in manufacturing processes. One of the more simple forms comprises a so-called disc-type strainer in which the water flows through a straining or filtering media carried on a rotatable disc disposed within a housing which has inlet and outlet connections, the arrangement being such that the water must pass through the straining media in flowing from the inlet to the outlet. The disc is rotated, either manually or by power, and at one point in its rotation the straining media flows under a backwash shoe or outlet to remove from such media accumulated solids.

A difficulty with such structures as heretofore provided has been in the excessive pressure drop through the strainer occasioned by the construction of the structure of the device even though adequate straining media is provided in the disc itself to relieve such pressure drop.

This invention is for a disc-type strainer in which the casing has inlet and outlet connections that are generally parallel with and close to the plane of rotation of the disc instead of being normal to such plane and the incoming water is caused to spread over the disc with minimum impedance and the outflowing water converges evenly from the discharge side of the disc to the outlet while the interior of the body is shaped to offer little impedance to the flow of water therethrough. The flow might be described as generally diagonal from the inlet connection to the outlet. Measurement confirms that this arrangement reduces the pressure drop to an extent where the area of the straining media may be substantially reduced without increasing the pressure drop from the inlet and outlet connections.

It is an object of the invention to provide a disc-type strainer for cleaning foreign matter from liquids flowing under pressure through a conduit without an appreciable pressure drop.

Another object is the provision of a strainer with a self-cleaning disc which separates foreign matter from a continuous stream of dirty fluid flowing under pressure in a conduit.

A further object is to provide a strainer which is compact in design and efficient in operation in either horizontal, vertical or diagonal positions.

Still another object is the provision of a strainer designed to withstand high working pressures.

A further object is to provide a disc-type strainer having straining media easily inspected and removably positioned within a housing.

A complete understanding of the invention may be had from the following detailed description of a specific embodiment thereof when read in conjunction with the appended drawings, wherein:

FIG. 1 is a plan view of the disc-type strainer;
FIG. 2 is a sectional view of the invention taken along line II—II of FIG. 1;
FIG. 3 is an end view into the inlet or outlet of the strainer;

FIG. 4 depicts in top view the disc of the strainer with filtering media positioned therein;
FIG. 5 is a cross-section of the cover and body of the strainer taken along line V—V of FIG. 1; and
FIG. 6 is an end view of an adapter element which is shown in elevation in the assemblage of FIG. 2.

Referring now to the drawings, wherein like reference characters designate like or corresponding parts throughout the several views, there is shown in FIG. 1, which illustrates a preferred embodiment, a top plan view of a strainer generally designated numeral 11 having a motor 12 coupled to a gear reduction box 13. The motor and gear reduction components are standard commercially available items which do not comprise the present invention per se, it being necessary only to provide a suitable drive means for the strainer 11 depicted in FIGS. 1, 2 and 5 which is shown in assembly for a power-driven operation.

The motor-driven gears of the reduction box 13 are connected to a shaft 14 by a coupling 15, FIGS. 2 and 5, the shaft being mounted for rotation on the approximate vertical center line of the strainer 11. A keyway 16 is provided in an upper reduced portion 17 of the shaft 14 within which a key 18 connects a gear axle (not shown) of the box 13 to the coupling 15, FIG. 2, and to the shaft 14.

As best shown in FIGS. 2 and 5, the strainer 11 is comprised of two concavo-convex dome-shaped sections, one being a cover 19 provided with a boss 21 suitably threaded to receive a gland nut 22 which confines a packing 23 in location to seal the shaft 14 passed through the gland and the packing. The cover 19 has a circumferential flange 24 to which is removably fastened by suitable means such as bolts 25, FIG. 1, the legs 26 of a bracket 27 upon which is supported the motor 12 and gear reduction box 13. The bracket 27 is provided with a mounting plate 28, FIG. 2, to which is connected an adaptor sleeve 29 forming a connection of the reduction box 13 to the bracket 27. The shaft 14 is received into the adaptor sleeve 29 and is keyed, as above described, to the gears of the box 13 through the coupling 15.

The other section 31 of the strainer 11, sometimes herein called the body, is of a shape and size generally similar to the cover, but it is provided with a circumferential flange 32 of a size and configuration to be bolted, for example, to the flange 24 of the cover 19 in matching engagement. A ring seal 33 is inserted between the metal flanges 24 and 32 to effect a water-tight seal between the cover 19 and the body 31 of the strainer 11. The two sections, with their concave faces in confronting relation, enclose a chamber of generally elliptical shape in vertical section, as clearly seen in FIGS. 2 and 5. An inlet 34 is integrally formed, for example, in the cover 19 and is internally threaded for a portion of its length for coupling to a conduit, not shown. Similarly, an outlet 35 is formed integrally with the body 31 diametrically opposite the inlet 34, both the inlet and outlet being developed circular in cross-section at their threaded outer end portions 36 and changing to an elliptical cross-section at the convergence of the walls of the cover and body with the inlet and outlet, respectively.

The transition of the circular to elliptical cross-section of the inlet 34 and the outlet 35 is shown in FIG. 3 which is a view looking axially into the inlet or outlet toward the hollow body 31 or cover 19. In FIG. 5 the transition is shown looking from the inside of the body 31 outwardly, the elliptical opening 37 being flush with the inner surface of the body, and changing to the circular aperture designated as numeral 38 toward the end portion 36 of the outlet 35. It is important to note that the elliptical opening 37 is tantamount to a flared opening which, in the case of the outlet 35, directs the flow of a liquid in a fan-like stream into the circular cross-sectional end portion 36. Inasmuch as the configuration of the inlet 34 is the same as that of the outlet 35, the description of the inlet in the cover 19 may be omitted.

The shaft 14 is supported at its reduced terminal portion 39 for rotation upon a thrust bearing 41 which is adjustable by means of a threaded fastener 42 engaged to a tapped bore 43 through the wall of the body 31. The fastener 42 extends within the body 31 and is formed with a concavity at its extremity within which is placed a ball bearing 44. The shaft portion 39 also is provided with a concavity at its extremity which is axially aligned with the fastener 42 and which overlies the ball bearing 44. The shaft 14 is accordingly mounted for rotation on the ball bearing 44, and is adjustable axially by the provision of the threaded fastener 42. A suitable sealing means such as a nut 45 with a seal 46 thereon is tightened by the fastener 42 against the body 31 to effect a watertight seal of the fastener to the body.

An upstanding boss 47 is formed, by means such as casting, on the inner surface of the body 31, and a bushing 48 is inserted therein for axial alignment and support for rotation of the shaft 14 on the thrust bearing 41 which includes the ball bearing 44 and the fastener 42.

As shown in FIGS. 2 and 5, a disc 49 is pinned to the shaft 14 for rotation, and is disposed so as to revolve within a ring or shoulder 51 of the body 31. The disc 49 divides the assembled body 31 and cover 19 into an inlet chamber 52 and an outlet chamber 53 which are equal in volume in the preferred embodiment. A backwash port 54 extends through a housing 55 which is wholly within the inlet chamber 52, and opens to the exterior of the strainer 11 at one end, and onto the surface 56 of the disc 49 at the other end. The latter end of the port 54 is of an enlarged cross-section as compared to the end of the port which opens to the exterior of the strainer, and the housing 55 terminates with an end portion 54 in a plane parallel with the surface 56 of the disc 49. The spacing between the portion 57 and the disc surface 56 is made variable by the adjustment of the fastener 42 of the shaft thrust bearing 41 whereupon the shaft 14 is moved axially, and with it the disc 49.

The disc 49 is drilled and tapped to form apertures 58, FIG. 4, which are equally spaced along concentric circles. The apertures 58 are designed to secure removable straining media such as wire mesh cones 59, for example. Of course, other media may be equally applicable such as slotted cones or flat perforated discs. Threaded retainer rings, not shown, removably position the straining media into the disc apertures 58.

The strainer 11 is designed for manual rotation of the disc 49 by the provision of a wrench adapter 61 which is shown in end elevation in FIG. 6 and installed on a gear shaft 62 of the gear box 13 in FIG. 2. The shaft 62 is turned by a hand tool to impart rotation to the shaft 14 through the coupling 15 to the gear box 13; thus, the shaft 14 may be rotated to revolve the filter or strainer disc 49 either by the motor 12 or by turning the adapter 61 manually.

It will be seen that the inlet and outlet ports are as close to opposite sides of the plane of the disc as is mechanically feasible. The elliptical contour of these ports spreads the flow of water in the plane of the discs and enables the inlet and outlet threaded connections to be larger in diameter than the vertical distance from the disc to the center of the dome section on which they are respectively formed. By reason of the dome-like contour of the cover section, the short axis of the inlet port 34 extends from near the flange of the cover over a greater portion of the arc from the plane of the flange to the center of the dome, so that the inlet port 34 in effect overhangs substantially the full area of the disc between the shaft and its periphery at that portion of the disc located under the inlet. The outlet port is similarly extended under the lower face of the disc. The combination of the elliptical cavity inside the body of the strainer with the disc in the plane of the long axis of the ellipse and with the above-described arrangement of inlet and outlet ports, are conducive to the reduction of the pressure drop through the strainer. It contributes to the compact size with large capacity and enables much less metal to be required to accommodate a given flow of water than is required in disc strainers as heretofore used. Moreover, this bringing of the inlet and outlet ports close to the plane of the disc enables the strainer to be located in a straight-through piping system without extra bends or elbows.

*Operation*

The strainer 11 is coupled to a conduit on the discharge side of a suction pump which draws raw water from a source of supply such as a river. The raw water is conducted through the strainer inlet 34 under pressure from the pump and is spread over the disc 49 forcefully by the flared design of the inlet elliptical cross-sectional opening 37 which is developed from the circular end portion 36. The water flows from the inlet chamber 52 through the disc apertures 58 and the strainer mesh cones 59 into the outlet chamber 53, and the strainer particles carried by the raw water remaining on the cones 59. The cleaned water is discharged through the outlet 35 under pressure to be conducted to its destination of use.

When the straining media or cones 59 accumulate foreign matter to an extent which is reflected by increase in pressure drop between the strainer inlet flow and outlet flow, a backwash valve, not shown, is opened and the disc 49 is rotated manually by turning the wrench adapter 61. As each of the cones 59 pass the backwash port 54, a reverse flow flushes the particles from the strainer media, the reverse flow being effectuated by the difference in pressure between the atmosphere into which the backwash port opens and the pressure of the fluid within the strainer 11. The backwash valve, not shown, is closed when the pressure drop of the fluid at the inlet and outlet returns to a normal differential. A fitting 63 is connected to the backwash housing 55 and extends beyond the cover 19 for attachment to a backwash valve.

In the preferred embodiment of the invention the space between the housing 55 of the backwash port 54 and the surface 56 of the disc 49 is adjusted to a clearance less than the opening presented by the straining media or cones 59. The kind of foreign matter, such as paper, sticks, leaves, or the like, and the desired degree of cleaning determine the type and opening size of the straining media.

Should motor operation of the strainer be desired, the motor 12 is energized to revolve the filter disc 49 during the entire straining period, or intermittently by a pressure-responsive switch which is actuated when the pressure drop of the liquid between the strainer inlet and outlet exceeds desired limits. The backwash valve would be controlled to operatae in correlation with the motor 12 in this event, and a suitable motor or penumatic cylinder-operated plug valve would be actuated by the pressure differential switch.

The straining media or cones 59 are visible for inspection and for changing through tapped openings 64 through the wall of the body 31, FIG. 5. The plugs 65 are arranged sealingly to close the openings 64. These openings also serve as drains for the strainer 11. Also, the bolts 25 which hold the cover 19 and body 31 together may be removed to expose the disc 49 for inspection, size substitution, or replacement of the filtering media.

Although the modification described and illustrated herein is for use where the atmospheric pressure is less than the pressure of the liquid within the strainer to effect a reverse backwash flow, it is within the scope of this invention to provide a high pressure backwash flow from a backwash shoe positioned directly opposite the backwash port 54 whereby the backwash flow is obtained from a source other than that of the liquid through the strainer. For example, if installation of the strainer is desired on the suction side of a pump, high pressure water to clean the media is diverted through a suitable backwash shoe from the discharge side of the pump or from some outside source.

The invention provides a compact strainer which is placed in the line of flow of a liquid, such as water, to clean the liquid by passage through a strainer disc which is self-cleaning by the backwashing feature of the strainer. The disc is rotatable either manually in the event of power failure, or by a motor, and the filtering media of the disc is capable of being continuously cleaned, whereupon the pressure drop across the strainer is maintained low. The strainer is efficiently operable in either horizontal, vertical, or diagonal attitudes, and the design of the strainer is such that a greater volume of liquid flow may be cleaned with fewer straining media for the same pressure drop as compared to known strainers.

It is manifest that the above-described embodiment of the invention is merely illustrative and that numerous modifications may be made within the spirit and scope of the invention.

I claim:

A rotary disc-type strainer comprising:

(a) a body formed of two hollow concavo-convex dome-shaped sections arranged with their concave faces in confronting relation and having confronting peripheral flanges secured together in water-tight contact, said sections defining an interior of generally elliptical shape in vertical section, (b) a shaft supported by said body having its axis conicident with an axis passing through the centers of said dome-shaped sections,
    said shaft having one end thereof extending through the center of one section, said one section having a packing gland at its center through which the shaft extends and beyond which the shaft projects, (c) means on the projecting end of the shaft for rotating said shaft, (d) means providing a thrust bearing for the shaft at the center of the other section and being accessible from the exterior of said other section for adjusting the shaft in an axial direction, (e) a strainer disc with straining media therein secured to said shaft in the plane of the confronting flanges of the sections and the long axis of the elliptical interior of the body, (f) one of said sections having a ring portion surrounding the disc and having a substantially sliding fit with the periphery of the disc, (g) one of said dome-shaped sections having an inlet pipe connection projecting therefrom parallel with the plane of the disc and terminating in an elliptical inlet port immediately above the disc, said elliptical port having its long axis parallel with the surface of the disc, the top of the port, due to the curvature of the dome, being closer to the center of said dome-shaped section than the peripheral flange thereof, the port in the direction of its shorter elliptical axis defining an arc extending the greater portion of the total distance from the peripheral flange of the section to the center of the section, (h) said inlet pipe connection being integral with said one section and extending diametrically outward from said port, said shorter axis increasing in dimension and said long axis decreasing in dimension in the direction away from said port until said pipe is circular, (i) the other section having an outlet port and connection similar to the inlet port and connection but located diametrically opposite the inlet port and connection, a fixed backwash enclosure on said section having the inlet pipe thereon, said enclosure terminating in an end surface parallel with the surface of the disc toward which it is directed and close to which it terminates, said enclosure having a backwash outlet passage extending through the dome-shaped section in a direction normal to the plane of the disc, said means for adjusting the shaft in an axial direction enabling the disc to be moved toward and away from the end surface of said backwash enclosure.

References Cited by the Examiner

UNITED STATES PATENTS

| | | | |
|---|---|---|---|
| 1,475,577 | 11/1923 | Green | 210—445 X |
| 2,310,587 | 2/1943 | MacNeil | 210—445 X |
| 2,834,474 | 5/1958 | Jalkanen | 210—108 X |
| 2,956,683 | 10/1960 | Kinney et al. | 210—333 X |
| 3,074,560 | 1/1963 | Kinney | 210—330 |

REUBEN FRIEDMAN, *Primary Examiner.*

J. DE CESARE, *Assistant Examiner.*